(No Model.)
C. L. RIKER.
COMBINED TRAP AND OVERFLOW FOR WASH BASINS, WATER CLOSETS, SINKS, &c.
No. 292,055. Patented Jan. 15, 1884.
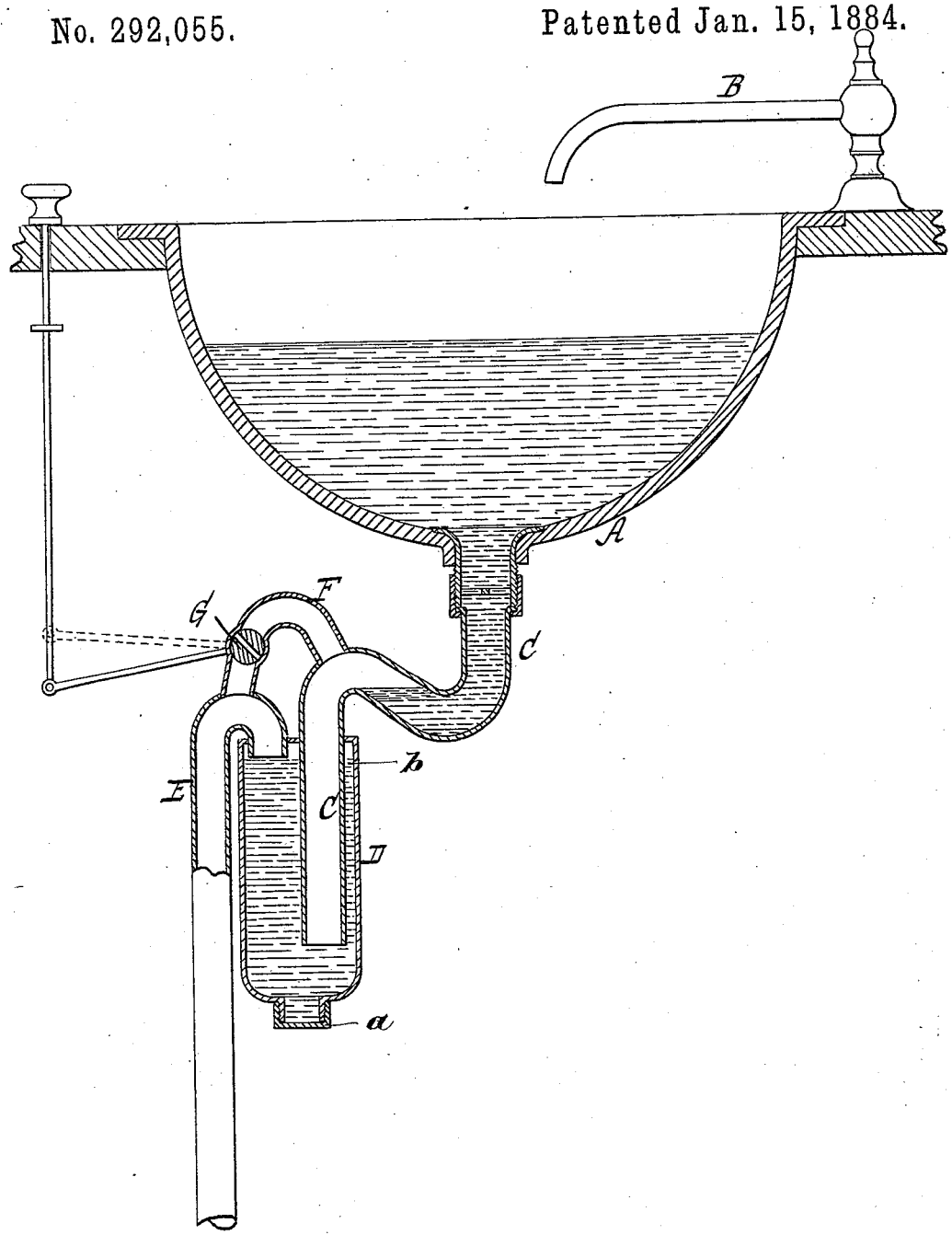
WITNESSES:
William Miller
Otto Hufeland
INVENTOR
Carroll L. Riker
BY Van Santvoord & Hauff
ATTORNEYS

United States Patent Office.

CARROLL L. RIKER, OF BROOKLYN, ASSIGNOR TO CHRISTOPHER GULLMANN, OF NEW YORK, N. Y.

COMBINED TRAP AND OVERFLOW FOR WASH-BASINS, WATER-CLOSETS, SINKS, &c.

SPECIFICATION forming part of Letters Patent No. 292,055, dated January 15, 1884.

Application filed July 18, 1883. (No model.)

*To all whom it may concern:*

Be it known that I, CARROLL L. RIKER, a citizen of the United States, residing at Brooklyn, in the county of Kings and State of New York, have invented new and useful Improvements in Combined Trap and Overflow for Wash-Basins, Water-Closets, Sinks, &c., of which the following is a specification.

This invention consists in the combination, with a basin, of a closed vessel situated beneath said basin, a pipe bent to approximate the form of an S-trap, and extending from the bottom of the basin into and near to the bottom of the closed vessel, a discharge-pipe extending from the top of the closed vessel and turning downward, a connecting-pipe which extends from the highest point of the S-trap into the discharge-pipe, and a stop-cock fitted into the connecting-pipe, so that when the closed vessel is filled with water, (the stop-cock in the connecting-pipe being closed,) and water is poured into the basin, the air in the S-trap pipe is compressed, and the water in the basin can rise to a certain level before it discharges; but as soon as the water in the basin rises above the desired level, the water contained in the basin discharges, and the danger of an overflow is avoided, while by opening the stop-cock in the connecting-pipe the water contained in the basin can be discharged whenever it is desired. At the same time the water contained in the closed vessel and in the S-trap shuts off noxious gases which may rise through the discharge-pipe. In the upper part of the closed vessel is formed an air cushion, to prevent shocks when the apparatus is in operation.

The accompanying drawing represents a vertical section of a basin provided with my trap and overflow.

In this drawing, the letter A designates a basin—such, for instance, as a wash-basin—which is supplied with water through the faucet B, or by any other means. From the bottom of this basin extends a pipe, C, which is bent to approximate the form of an S-trap, and which leads into a closed vessel, D, extending down near to the bottom of this vessel. In the bottom of this vessel is an opening, which is closed by a cap, a plug, or by any other suitable means, so that by removing said cap or plug any sediment which may accumulate in the vessel can be discharged. From the top of the vessel D extends the discharge-pipe E, which is bent and turns downward, and which leads into a sewer or waste-pipe, or into a reservoir, which may serve to receive the waste water.

F is a pipe which connects the S-trap pipe C with the discharge-pipe E. The connection between the pipe F and the S-trap pipe C is made at or near the highest point of the S-trap, and in said pipe F is fitted a stop-cock, G. The plug of this stop-cock can be turned either by the direct application of the hand, or intermediate devices may be used for this purpose—such, for instance, as those indicated in the drawing. The upper end of the discharge-pipe E extends a short distance down into the closed vessel D, so that when the vessel is being filled with water an air cushion in a chamber, $d$, is formed in its upper part, which prevents noise when the apparatus is put in operation. When the stop-cock G is closed and water is poured into the basin, the air contained in the upper portion of the S-trap pipe C and in the downward branch of the said trap-pipe is compressed, and the water in the basin can reach a certain level before it discharges. If the water in the basin rises beyond the desired level, its pressure forces the air contained in the air-chamber $b$ of the vessel D out through the discharge-pipe E, and the water from the basin discharges, so that an automatic overflow is produced. The water contained in the basin may, however, be discharged at any moment by turning the stop-cock G, so that the compressed air contained in the trap-pipe C can escape through the connecting-pipe F and the discharge-pipe E.

My invention is of great advantage for wash-basins, for the basins of urinals or water-closets, for sinks, and for devices of a similar nature.

It will be understood from the foregoing description that my apparatus acts as a trap and overflow without the connecting-pipe F, this pipe, with its stop-cock, being used simply to enable a person to discharge the water from the basin at any time it may be desirable.

What I claim as new, and desire to secure by Letters Patent, is—

1. The combination, substantially as hereinbefore described, with the basin, of the closed vessel situated beneath said basin, the pipe bent to form the trap, and extending from the bottom of the basin into and near to the bottom of the closed vessel, the discharge-pipe, extending from the top of the closed vessel and turning downward, the connecting-pipe, which extends from the highest point of the trap into the discharge-pipe, and the stop-cock fitted into the connecting-pipe.

2. The combination, substantially as hereinbefore described, with the basin, of the closed vessel situated beneath said basin, and constructed so as to provide an air cushion in the top thereof, the pipe bent to form the trap, and extending from the bottom of the basin into and near to the bottom of the closed vessel, the discharge-pipe, extending from the top of the closed vessel and turning downward, the air cushion formed in the top of the closed vessel, the connecting-pipe, which extends from the highest point of the trap into the discharge-pipe, and the stop-cock fitted into the connecting-pipe.

3. The combination, substantially as hereinbefore described, with the basin, of the closed vessel situated beneath said basin, the pipe bent to form the trap, and extending from the bottom of the basin into and near to the bottom of the closed vessel, and the discharge-pipe, extending from the top of the closed vessel and turning downward.

In testimony whereof I have hereunto set my hand and seal in the presence of two subscribing witnesses.

CARROLL L. RIKER. [L. S.]

Witnesses:
   W. HAUFF,
   E. F. KASTENHUBER.